Aug. 1, 1961  R. F. BARDWELL ET AL  2,994,166
METHOD OF MAKING MULTIFOCAL LENSES
Filed Dec. 13, 1957  3 Sheets-Sheet 1

INVENTORS
RALPH F. BARDWELL
RUSSELL J. CASSETTARI
BY
Louis F. Gagnon
ATTORNEY

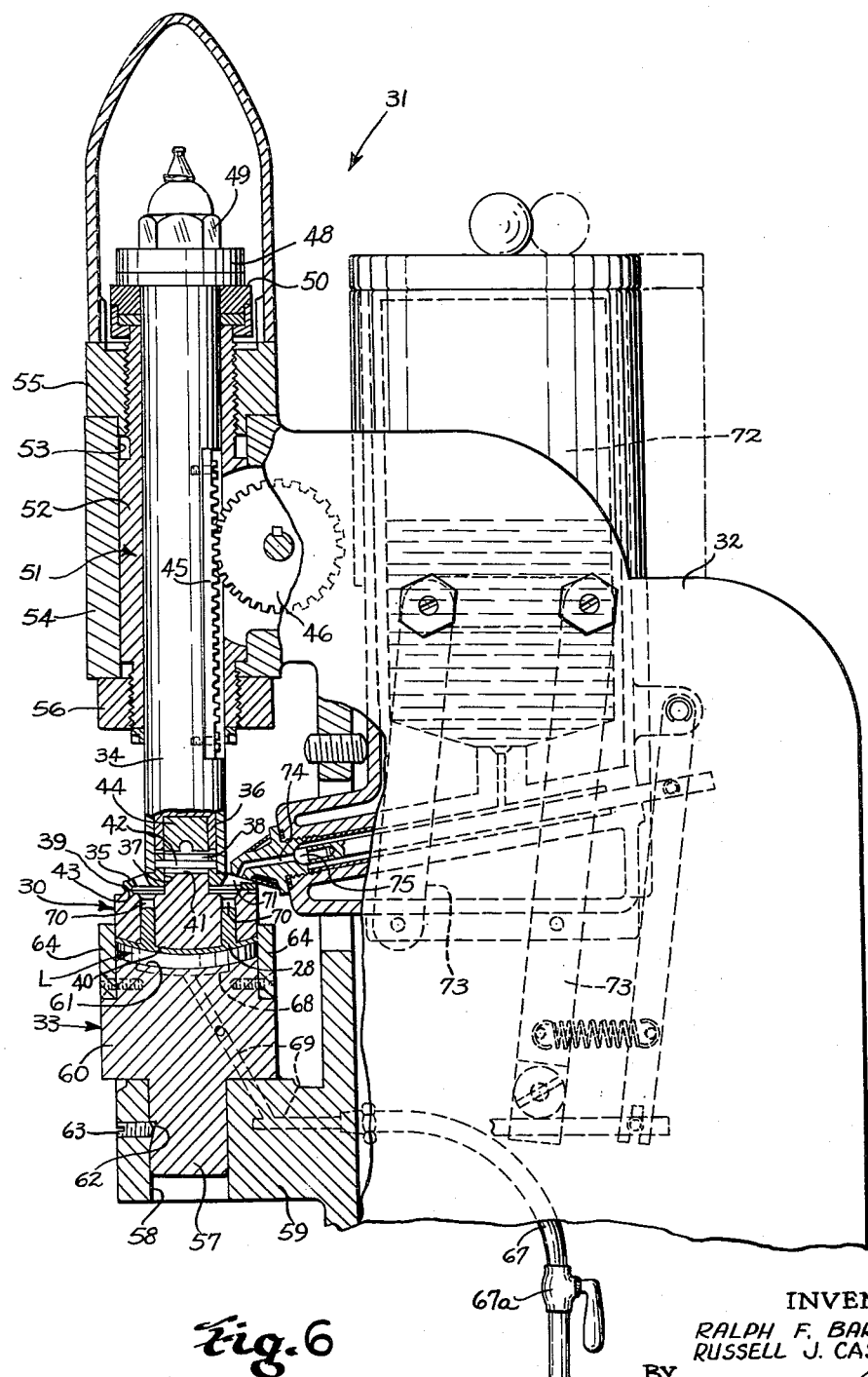

Aug. 1, 1961 R. F. BARDWELL ET AL 2,994,166
METHOD OF MAKING MULTIFOCAL LENSES
Filed Dec. 13, 1957 3 Sheets-Sheet 3
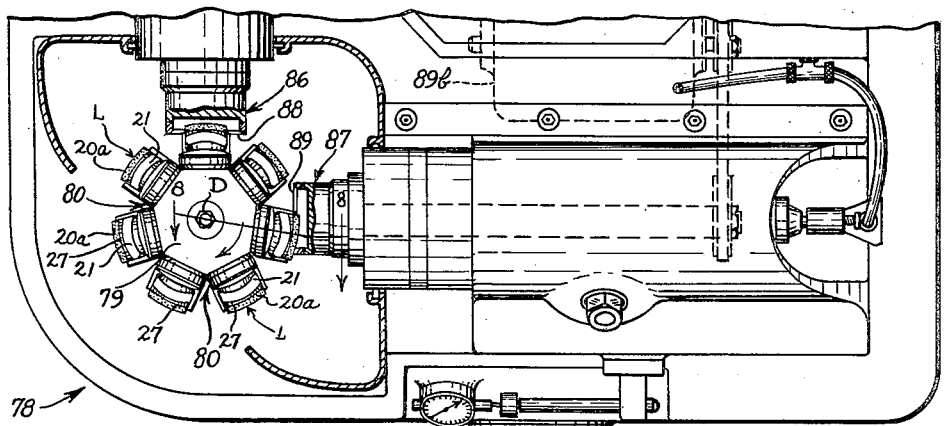
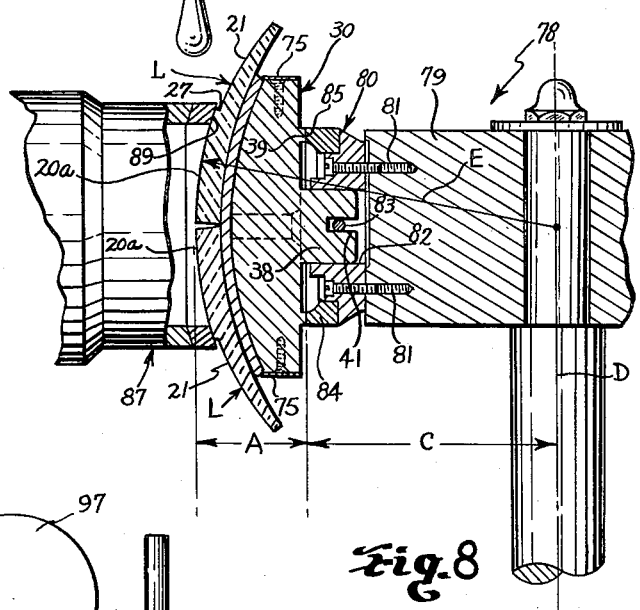
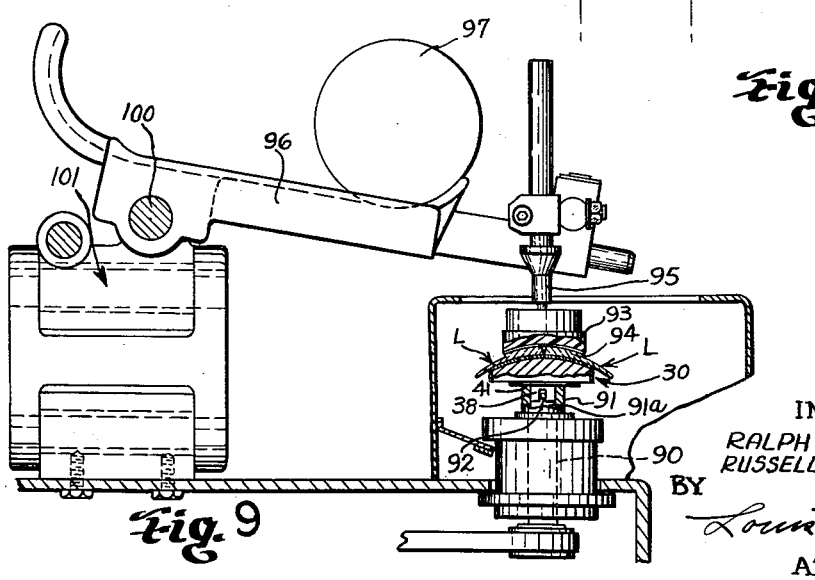
INVENTORS
RALPH F. BARDWELL
RUSSELL J. CASSETTARI
BY
Louis L. Gagnon
ATTORNEY United States Patent Office 2,994,166
Patented Aug. 1, 1961

2,994,166
METHOD OF MAKING MULTIFOCAL LENSES
Ralph F. Bardwell, Brimfield, and Russell J. Cassettari, Webster, Mass., assignors to American Optical Company, Southbridge, Mass., a voluntary association of Massachusetts
Filed Dec. 13, 1957, Ser. No. 702,634
4 Claims. (Cl. 51—284)

This invention relates to improvements in lens manufacturing procedures and has particular reference to novel means and method of simultaneously finishing a plurality of semi-finished one piece multifocal lens blanks of the type having wide focal fields and a substantially straight line of division between said fields.

It is a principal object of the present invention to provide improved lens manufacturing apparatus and techniques for accurately simultaneously providing a plurality of semi-finished one piece multifocal lens blanks of the above nature with controlled similar physical characteristics.

Another object is to provide novel means and method for blocking semi-finished one piece multifocal lens blanks and for simultaneously forming certain surface areas of a plurality of said blanks to a given controlled shape.

Another object is to provide improved means and method of simultaneously completing a plurality of one piece multifocal lens blanks, each initially having an optically finished reading field and a semi-finished distance field thereon joined by a susbtantially straight cliff-like line of division extending across a side surface of said blanks, with an optically finished surface curvature on said distance fields while simultaneously causing said line of division to be reduced to a desired minimum height.

Another object is to provide novel means and method of expediating and more economically optically finishing semi-finished one piece multifocal lens blanks of the above character by blocking the blanks in pairs on individual blocks and providing means for successively attaching the blocks first to surface abrading means and then to polishing means in predetermined identical positions relative to said means without having to reblock said blanks.

Another object is to provide improved precision means for blocking a pair of one piece multifocal lens blanks of the above type each having a finished reading field and a semi-finished distance field respectively on one side surface thereof wherein said distance fields of the blanks will be in adjacent edge-to-edge relation and so arranged relative to each other than when the desired finished surfaces are formed on said distance fields their centers of curvature will be in monaxial relation with the centers of curvature of the reading fields.

Another object is to provide an improved lens block for receiving one piece multifocal lens blanks of the above character and for use with abrading means adapted to operatively successively receive a plurality of said blocks in such a manner as to cause certain semi-finished surface areas to be rapidly and accurately abraded on said blanks to a predetermined depth and curvature in a single operation.

A further object is to provide a one piece multifocal lens manufacturing procedure of the above character which greatly simplifies the finishing of distance fields of said lens blanks by providing a highly accurate blocking technique for mounting pairs of said lens blanks in a compact fashion on easy to handle blocks which are readily adapted for use in carrying out subsequent surface generations on the lens blanks without causing any disfigurations of the first formed surfaces on said blanks.

Other objects and advantages of the invention will become apparent from the following description when taken in conjunction with the following drawings, in which:

FIG. 6 is an enlarged fragmentary cross-sectional view taken substantially on line 6—6 of FIG. 5 looking in the direction of the arrows with parts thereof shown in elevation;

FIG. 7 is a fragmentary top plan view of a lens abrading apparatus used in the process of the invention;

FIG. 8 is an enlarged fragmentary cross-sectional view taken substantially along line 8—8 of FIG. 7 looking in the direction of the arrows; and FIG. 9 is a fragmentary side view of a preferred type of lens blank polishing apparatus used to bring about the final step in the process of the invention.

Figure 1:
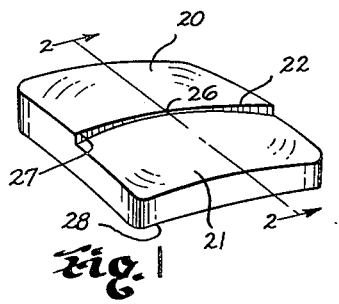
FIG. 1 is a perspective view of a lens blank formed in accordance with the invention.

Referring more particularly to the drawings wherein like characters of reference designate like parts throughout the various views, one form of a finished lens blank embodying the invention is shown in FIG. 1 and comprises a single piece of lens medium, preferably optical crown glass or other transparent material initially formed to a predetermined standard outer contour shape and size and having an upper or distance field 20 and a lower or reading field 21. The fields 20 and 21 are separated by a substantially straight dividing line 22 which passes through the optical axis of the lens blank so as to provide said lens blank with a wide reading field 21 extending transversely throughout the width thereof.

Figure 2:
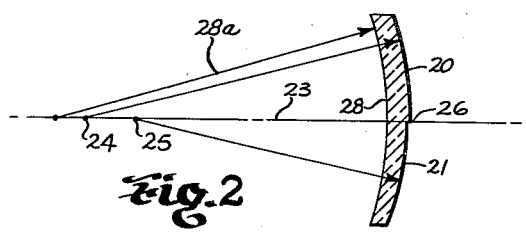
FIG. 2 is a cross-sectional view of the lens blank taken substantially on line 2—2 of FIG. 1 and including a diagrammatic illustration of the centering of its different focal fields.

Referring more particularly to FIG. 2, wherein dot-dash line 23 represents the optical axis of the finished lens blank, it will be seen that the center of curvature 24 of the distance field 20 and the center of curvature 25 of the reading field 21 both lie on axis 23 and the optical centers 26 of fields 20 and 21 will, therefore, be in monaxial relation with each other as illustrated in FIGS. 1 and 2. Moreover, it is to be noted that the centers 24 and 25 of the surface curvatures of fields 20 and 21, respectively, are so positioned along the optical axis 23 as to provide a near mergence or very slight shouldering at the optical centers 26 of fields 20 and 21 and thus cause the dividing line 22 to be reduced to a practical minimum height adjacent said centers. The above mentioned relation of the optical centers 26 substantially eliminates the error of "jump" when the line of vision of the eye passes from one field to the other. Dividing line 22, however, produces a ledge 27 which progressively increases in height toward the outer edges of the lens blank, which height is determined by the difference in curvatures of fields 20 and 21.

The finished lens is formed from the lens blank by providing its opposite side 28 with a finished optical surface of a curvature 28a which is such that, when combined with the curvatures of fields 20 and 21, will provide the required prescriptive powers in said fields. The final thickness of the finished lens is determined by the depth to which surface 28 is formed.

It is to be understood that the term "multifocal" as used in this specification and accompanying claims is intended to mean lenses having two or more focal fields. In the description immediately following, the process of manufacturing lenses having only two focal fields, namely a distance portion and a reading portion, will be discussed. However, it will become apparent that lens blanks having more than two focal fields may also be manufactured by said process.

In order to simplify the following description, the surface curvatures of the above mentioned distance portion and reading portion will be referred to as the DP and RP curves, respectively.

In manufacturing one piece multifocal lens blanks of the above character it has been found most desirable to proceed by selecting a plurality of lens blanks having a predetermined standard outer contour shape and size and to provide a rough abraded or semi-finished spherical curvature over the entire surface area of one side of each of said lens blanks by any of the known standard methods of lens grinding. In this instance, the semi-finished surface curvature is accurately controlled to be of a radius longer than the finished radius of curvature desired of the distance viewing portion of the finished lens by an amount equal to the thickness of the material which is to be removed from said semi-finished surface during the finishing of said distance curvature. The near vision or reading portion of each of the lens blanks is formed by abrading and optically polishing a predetermined section of the area of said semi-finished surface to a predetermined depth and shorter radius of curvature than that desired of the distance portion, which radius is such as to provide a desired add in the power of the reading portion over the distance portion of the finished lens in the manner disclosed in detail in the application of John H. Kress, Serial No. 642,450 filed February 26, 1957.

Figure 3:
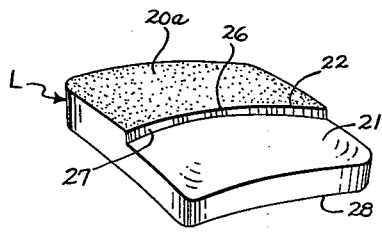
FIG. 3 is a perspective view of a lens blank partially finished and from which the finished lens blank of FIG. 1 is formed in accordance with the process of the invention.

At this point, each of the lens blanks has taken substantially the form illustrated in FIG. 3 of the drawings wherein the depth to which the reading portion 21 is formed is such as to produce a ledge 27 of a predetermined height somewhat greater than that desired on the finished lens. It is preferable to cause the ledge 27 between the semi-finished DP surface 20a and the finished RP surface 21 to be of a height, at the center 26 of the lens blank, of approximately .200 of a millimeter greater than the height of ledge desired on the finished lens. By reducing the thickness of the semi-finished distance portion of the lens blank by approximately .200 of a millimeter during the subsequent finishing of the distance surface the ledge 27 will be automatically reduced to the desired height. For example, the height of the ledge 27 at the optical center 26 of each of the finished lens blanks should preferably be no greater than .200 of a millimeter and should be held within the range of .030 to .200 of a millimeter.

The present invention is directed more particularly to improved, more expedient and economical means and method of finishing the semi-finished DP surfaces 20a of semi-finished lens blanks L of the type illustrated in FIG. 3.

Figure 4:
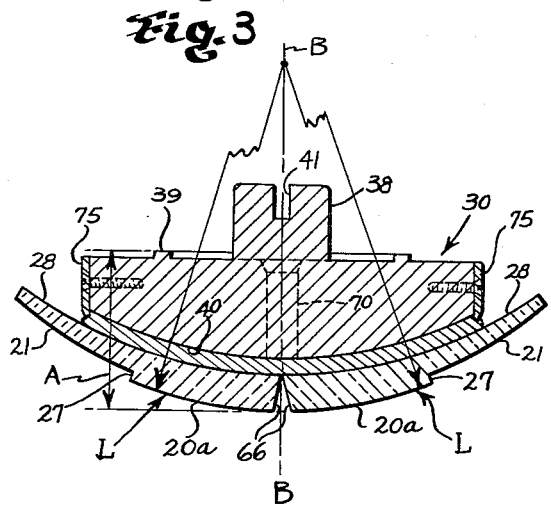
FIG. 4 is a cross-sectional view of a pair of lens blanks which are blocked in a manner featured in the process of the invention.
Figure 5:
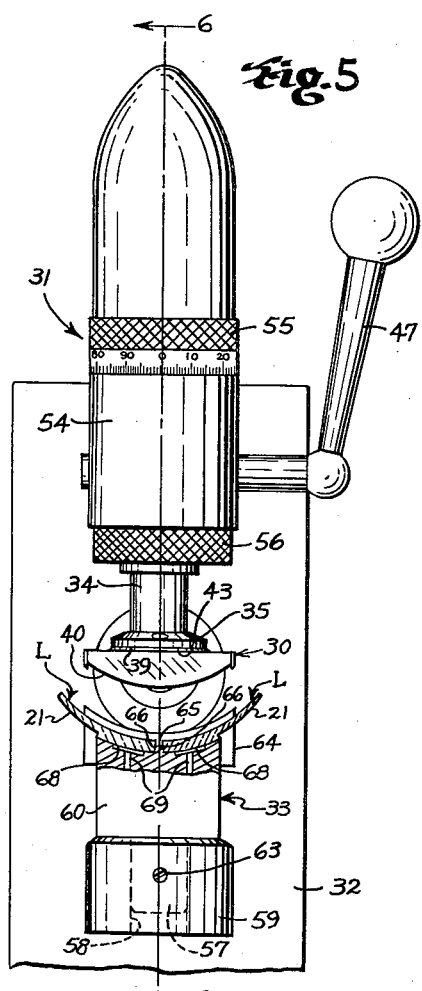
FIG. 5 is a fragmentary front elevational view of a preferred form of blocking apparatus used in conjunction with the process of the invention.

In accordance with invention, a plurality of lens blanks L are first blocked in pairs on individual lens blocks 30, FIG. 4, by means of a precision blocking unit 31, FIGS. 5 and 6. The blocking unit 31 embodies a base 32 having a fixture 33 thereon for supporting a pair of lens blanks L in predetermined aligned relation with each other during the blocking operation and a longitudinally movable block carrying shaft 34 mounted for reciprocal movement therein. The lowermost end of shaft 34 is provided with an adaptor 35 which is rigidly secured thereto for receiving and holding a lens block 30 in the manner illustrated in FIGS. 5 and 6. The adaptor 35 is fitted into a bore 36 provided in the end of shaft 34 and is in itself provided with an internal bore 37 adapted to snugly receive a shank part 38 of block 30. The shank part 38 is preferably constructed of a ferrous material and in addition to having a shank 38, the block is also provided with an accurately machined annular reference surface on one side formed of a ferrous material and a spherically curved lens mounting surface 40 on its opposite side of approximately the curvature of the concave surface 28 of the blanks L to be mounted thereon. A slot 41 is provided in the shank part 38 of block 30 and a locating pin 42 is provided in bore 37 of adaptor 35 to fittingly engage slot 41 when the shank 38 of block 30 is operatively positioned in adaptor 35 with its reference surface 39 in engaging relation with the lower annular surface 43 of adaptor 35. A permanent magnet 44 is provided within bore 36 of shaft 34 to detachably hold block 30 in adaptor 35.

The shaft 34 of the blocking unit 31 is provided with a rack 45 which is engaged by a pinion 46 having an operating handle 47 attached thereto for moving the block 30 toward or away from the fixture 33 in a direction along the longitudinal axis of the shaft 34. A collar 48 is secured to the uppermost end of shaft 34 by a nut 49 which functions to limit the downwardly directed movement of shaft 34 by striking the uppermost end 50 of a longitudinally adjustable guide member 51 which supports shaft 34 in the base 32 of the blocking unit 31. The guide member 51 is generally tubular in shape and is externally threaded at its upper and lower ends and is provided with an intermediate portion 52 which is slideably fitted within a bore 53 in the head part 54 of base 32. Upper and lower internally threaded retaining rings 55 and 56 are provided on the respective upper and lower threaded ends of guide member 51 to retain the guide member 51 in adjusted position in the bore 53 of head part 54. The rings 55 and 56 are of an outer diameter greater than the diameter of the bore 53 to overlie their respective ends of the bore 53 and when threaded along the guide member 51 in a direction toward each other they will clamp member 51 to the head part 54 in the manner shown in FIG. 6. By loosening one of the rings 55 or 56 and tightening the other, it can be seen that the guide member 51 may be adjusted upwardly or downwardly in the bore 53 of head part 54 so as to raise or lower the upper end 50 thereof which provides a stop to limit the downward movement of shaft 34 in guide member 51. By properly adjusting rings 55 and 56, a predetermined spacing between block 30 and fixture 33 may be provided when the shaft 34 is moved to its lowermost position at which time collar 48 will engage end 50 of member 51.

Fixture 33, which is adapted to align and support a pair of lens blanks L to be blocked, is provided with a depending shank part 57 which is fitted into a bore 58 in an outwardly extending supporting part 59 of the base 32 of the blocking unit 31. The body portion 60 of fixture 33 is provided with a concave spherically curved lens blank receiving seat 61 of a radius of curvature substantially equal to that of the semi-finished DP surfaces 20a of the lens blanks L to be placed thereon. The bore 58 of supporting part 59 is so located with respect to the longitudinal axis of shaft 34 as to cause the center of curvature of the spherically curved seat 61 of fixture 33 to lie on the longitudinal axis of shaft 34 when the fixture 33 is mounted therein in the manner illustrated in FIG. 6. A flat 62 is provided on the shank 57 of fixture 33 which is engaged by a clamp screw 63 in the supporting part 59 to prevent rotation of fixture 33 so as to retain the same in a desired orientation relative to block 30 when said block is attached to shaft 34 in the above described manner. In this respect, block 30 is of a width substantially equal to the width of one of the lens blanks L but of a length considerably greater than its width so as to support the major portion of the concave surface areas of a pair of lens blanks L when they are blocked thereon in edge-to-edge relation with each other as shown in FIGS. 4, 5 and 6. The slot 41 in shank part 38 of block 30 is disposed in the direction of the width of block 30 and when block 30 is positioned in the adaptor 35, the locating pin 42 therein will cause block 30 to have one of its longest sides face forwardly of the blocking apparatus 31 in the manner shown in the drawings and more particularly in FIG. 5 thereof. A pair of side plates 64 are screwed or otherwise attached to the fixture 30 so as to provide guide means for receiving the block 30 in the manner illustrated in FIG 6. The spacing between plates 64 is controlled to be substantially equal to the width of block 30 and the above mentioned orientation of fixture 33 is controlled to permit the sides of block 30 to intimately slidingly fit between plates 64 of the fixture 33 when the block 30 is lowered during the blocking operation.

A transversely extending ridge or lens blank locating member 65, FIG. 5, is provided on the spherically curved lens blank receiving seat 61 of fixture 33. Member 65, which extends between the side plates 64, is in intersecting relation with the longitudinal axis of shaft 34 and serves as a means for locating the adjacent edge parts of lens blanks L in near meeting relation with the longitudinal axis of shaft 34. This will ultimately cause the centers of the lens blanks L to be substantially equally spaced, one at each side of the central axis of block 30 when said lens blanks are finally mounted on block 30.

The mounting of lens blanks L on block 30 is accomplished as follows:

A pair of lens blanks of the character illustrated in FIG. 3 each having a semi-finished DP surface 20a and an optically finished RP surface 21 are positioned on the spherically curved seat 61 of fixture 33 with the DP surfaces 20a thereof in fitting relation with said seat 61 and the edges 66 thereof in engaging relation with the locating member 65 as shown in FIG. 6. It can then be seen that since the curvature of seat 61 of fixture 33 is of a radius substantially that of the semi-finished DP surfaces 20a of blanks L and the fixture 33 is axially aligned with the longitudinal axis of shaft 34, the centers of curvature of the DP surfaces 20a of the blanks L will lie in substantially coincident relation with each other on the longitudinal axis of shaft 34. In order to retain the lens blanks L in the above mentioned aligned relation with each other on fixture 33, a vacuum system of any conventional nature, not shown in the drawings, is provided and is connected to the blocking apparatus 31 by a vacuum line such as a hose or the like 67. A pair of recessed vacuum chambers 68 is provided in the seat 61 of fixture 33, FIGS. 5 and 6, in communicating relation with each of the semi-finished surfaces 20a of lens blanks L and the chambers 68 are interconnected with the vacuum line 67 by channels 69 which extend through fixture 33 and base 32 of the apparatus 31. A vacuum effect created in line 67, channels 69 and chambers 68 will cause the lens blanks L to be firmly held in seated relation with fixture 33.

With the lens blanks L so supported by fixture 33, the block 30, having been attached to adaptor 35 of shaft 34 in the manner discussed above, is lowered into interfitting relation with the side plates 64 of fixture 33 and to a point where the surface 40 of block 30 is slightly spaced from the concave surfaces 28 of lens blanks L. In order to provide a predetermined axial distance A, FIG. 4, between the semi-finished surfaces 20a of blanks L and the reference surface 39 of block 30 when the blanks L are finally blocked, for the purpose of accurately abrading said surfaces 20a in an operation to follow, the adjustable member 51 is raised or lowered by manipulating rings 55 and 56 to locate its upper end 50 at a predetermined position which when engaged by collar 48 will limit the downwardly directed movement of shaft 34 and locate the reference surface 39 of block 30 at the mentioned predetermined axial distance A from the surfaces 20a of blanks L.

The lens blanks L are next attached to block 30 by filling the spacing between the concave surfaces 28 thereof and the surface 40 of block 30 with a suitable blocking medium preferably in the form of a low temperature melting metallic alloy such as the well known and commercially available product known to the trade as "Cerrolow" which is manufactured and sold by the Cerro de Pasco Copper Corporation of New York. It is pointed out that in instances where the concave surfaces of the lens blanks are of a relatively rough texture, said surfaces are provided with a thin coating of paint which when dried will provide a smooth mounting surface for receiving the blocking medium. To accomplish the filling of the space between the lens blanks and block, the block 30 is provided with apertures 70 extending therethrough, FIGS. 4 and 6, and at least one aperture 71 is provided in the adaptor 35 which communicates with one of the apertures 70 in the block 30. A tank 72 containing a supply of melted blocking medium is provided in the base 32 of the blocking unit 31 and tank 72 is adjustably mounted on base 32 with lever arms 73 for selectively moving it toward or away from the adaptor 35. A nozzle 74 is provided on the forward lower end of tank 72 which is adapted to assume a position over aperture 71 in adaptor 35 when the tank is moved forwardly on base 32 and a suitable valve mechanism 75 is provided to allow the blocking medium to flow from nozzle 74 through apertures 71 and 70 to fill the space between lens blanks L and block 30. It can be seen, more particularly in FIG. 6, that the side plates 64 of fixture 33 function to prevent the blocking medium from flowing outwardly in a sidewise direction from between lens blanks L and block 30 since the side edges of both the block and lens blanks are closely fitted against the side pieces 64. The ends of block 30, however, are provided with plates 75 which are screwed or otherwise attached thereto and extend in a direction toward the convex surfaces 28 of the lens blanks L while being spaced from said surfaces 28. The plates 75 function to aid in preventing the blocking medium from flowing outwardly of the space between the lens blanks L and the surface 40 of block 30. Although a slight outwardly directed oozing of the blocking medium might take place between the plates 75 and the lens blanks, no appreciable amount of material will be lost since upon contacting the air the blocking material will immediately begin to harden and become less viscous.

When the blocking medium has hardened it will cause the lens blanks L to adhere most tenaciously to the block 30. Removal of the block 30 and lens blanks L attached thereto from the blocking apparatus is accomplished by raising shaft 34 to cause the block to become detached from the shaft 34. The vacuum is next shut off by operation of a valve or the like 67a in the vacuum line 67 and the block is lifted from the fixture.

From the above it can be seen that precise means and method have been provided for blocking a pair of lens blanks L on a single block 30 and that the centers of curvatures of each of the semi-finished surfaces 20a of the lens blanks are coincident with each other and lie on a common axis which is the central axis B—B of block 30, FIG. 4. Furthermore the axial distance A from the reference surface 39 of block 30 to surfaces 20a of lens blanks L is precisely controlled to be of a predetermined value to be used in conjunction with the finishing of surfaces 20a.

It is particularly pointed out that the DP surface curvature is commonly referred to as the base curve of lens blanks of the character described and that such lens blanks must be provided with a number of different base curves to meet the requirements of the optical profession. Due to this fact, it is essential to provide an individual lens blank holding fixture 33 for each change in base curvature of the lens blanks to be blocked. That is, the curvature of seat 61 must be substantially of the same radius as that of the semi-finished surface 20a of the lens blanks to be supported thereby in order to align the centers of curvature of surfaces 20a with the axis B—B of block 30 in the previously discussed manner. Furthermore the lens blank mounting surfaces 40 of the blocks must be controlled in shape in accordance with the curvature of the concave surfaces of the lens blanks to be mounted thereon so as to provide an adequate spacing between said concave surfaces and the block for receiving a blocking medium in the manner also discussed above.

It is pointed out that the ledges 27 of the lens blanks L are of a height somewhat greater than that desired on the finished blanks and the surfaces 20a must be abraded to the precise curvature desired of the DP portions thereof while controlling the depth of cut on said DP portions to reduce the height of ledges 27 a required amount.

With the lens blanks L mounted on block 30 in the manner illustrated in FIG. 4 and discussed above, the final abrading of the semi-finished surfaces 20a is accomplished by placing the block on an abrading apparatus 78 such as illustrated in FIGS. 7 and 8.

The abrading apparatus 78 is provided with a rotatable wheel-like holder 79 having a plurality of lens block receiving members 80 radially disposed about its periphery for each receiving a lens block 30 having a pair of lens blanks L mounted thereon. The holder 79 is adapted to be preferably continuously rotated and a plurality of pairs of lens blanks which are blocked in the above described manner are each successively mounted on an individual one of the block receiving members 80 during the rotation of holder 79 and removed therefrom at the completion of an abrading cycle to be replaced by another pair of unfinished similarly blocked lens blanks. Although the abrading procedure is performed on a continuous basis, the abrading cycle for only one of said pairs of unfinished blocked lens blanks will be described in detail hereinafter, it being understood that other similarly blocked lens blanks on holder 79 would simultaneously be in various stages of their abrading cycle during the abrading of the lens blanks to be described.

Each of the block receiving members 80 is generally cup-shaped and is attached to the holder 79 by screws or the like 81 in the manner shown in FIG. 8. A longitudinal bore 82 of a size adapted to intimately receive the shank 38 of block 30 is provided in member 80 and a locating pin 83 extending across the bore 82 is adapted to interfit with the slot 41 in block 30 to cause the direction of its longest dimension to be in substantially parallel relation with the axis of rotation of the holder 79, FIG. 8. A ring-shaped permanent magnet 84 on member 80 is provided with an accurately machined annular reference seat 85 which is contacted by the reference surface 39 of block 30 when said block is properly positioned in member 80 in the manner shown in FIG. 8. The distance C from the axis of rotation D of holder 79 is precisely controlled in accordance with the previously described distance A on block 30 to cause the combined distances A and C to be precisely equal to the radius of curvature E which is to be abraded on the semi-finished surfaces 20a of the lens blanks L.

In order to produce a spherical curvature on surfaces 20a of lens blanks L, a pair of rotatable cup-shaped abrading tools 86 and 87 are provided on the abrading apparatus 78, FIG. 7. Tools 86 and 87 are preferably of the well known diamond-charged type having abrading face portions 88 and 89 respectively which are accurately preformed to a radius of spherical curvature precisely equal to the radius of curvature E to be produced on the surfaces 20a of lens blanks L. The tools 86 and 87 are each of an outside diameter greater than the width of the combined semi-finished surfaces 20a of the pair of blocked lens blanks L and are aligned with their axes of rotation disposed along the longitudinal axis of block 30 which is in normal relation to the axis of rotation of holder 79 so as to cause the tools 86 and 87 to simultaneously abrade both of the surfaces 20a of lens blanks L when in operation.

With the holder 79 being rotated in a clockwise direction as viewed in FIG. 7, so as to cause the lens blanks L to first engage tool 86 and then tool 87, it is preferable to locate the abrading face portion 88 of tool 87 at a distance from axis D of holder 79 which is slightly greater than the desired radial distance E to be applied to lens blanks L but close enough to axis D to abrade away the major portion of the material intended to be removed from surfaces 20a of lens blanks L. The finish abrading of surfaces 20a of lens blanks L is then brought about by tool 87 which is located with the curvature of its abrading face 89 at a radial distance from axis D of holder 79 precisely equal to the radial distance E, FIG. 8. This causes the surfaces 20a of lens blanks L to be formed spherical in shape and the ledges 27 thereof to be reduced to their initially desired height.

Although the abrading of lens blanks L could be accomplished with the use of only one abrading tool such as tool 87 it has been found preferable to use the two tools 86 and 87 as described above and to form the abrading face 88 of tool 86 of a relatively coarse or rough type of abrading material for removal of the major portion of the material from surfaces 20a while providing a fine or finish type of abrading material on the face 89 of tool 87 to produce the final finish abrading of surfaces 20a. In this manner, a smooth and clear cut edge is formed along the dividing line 22 of the finished lens blanks whereas a single cut performed by the use of only one tool might tend to cause a flaking or damaging of the edge of ledge 27 since the full depth of cut on surfaces 20a would have to be made by the single tool and at best, it would be necessary to slow down the rate of removal of the material from surfaces 20a to produce an acceptable finished lens blank. The tools 86 and 87 are each rotated about their axes by means of suitable drive motors 87B, one of which is shown in FIG. 7.

When a pair of blocked lens blanks has passed over the abrading faces 88 and 89 of both tools 86 and 87, in that order, the lens block upon which the lens blanks are mounted is removed from holder 79 and replaced by another pair of similarly blocked lens blanks to be abraded.

It is pointed out that when finally abraded, the surfaces 20a of lens blanks L are formed to a precise spherical curvature of a radius E which, as stated above, is controlled in accordance with the radius of curvature desired on the lens blanks. If the base curve of the lens blanks is to be, for example, 6.50 diopters the radius E would be controlled to equal to 81.53 millimeters. It is also pointed out that in order to produce lens blanks having different base curvatures it is essential to provide an individual holder 79 and set of tools 86 and 87 for each base curve to be applied to the lens blanks. That is, the distance C of the holder is controlled in accordance with the radius of curvature to be applied to the lens blanks L and the radius of curvature of the abrading face portions of the abrading tools must be equal to the radius of curvature of the base curvature desired on blanks L.

With the lens blanks finally abraded in the above manner it remains only to optically finish the surfaces 20a of blanks L by polishing the same and this is accomplished by means of any suitable, preferably high speed, polishing mechanism such as illustrated in FIG. 9.

The blocked lens blanks 30, having been removed from the abrading apparatus 78, are positioned upon a rotatable shaft 90 which is provided with an adaptor 91 having a bore 91a therein adapted to intimately receive the shank 38 of block 30. A drive pin 92 is provided in the adaptor 91 which interfits with the slot 41 of block 30 to cause block 30 and lens blanks L to rotate with shaft 90. It is pointed out that the lens blanks L are not reblocked between the abrading and polishing operations. The blocks 30, being interchangeable, are simply removed from the receiving members 80 of the abrading apparatus and applied to the adaptor 91 of the polishing mechanism.

A conventional high speed type of polishing tool 93 having a preformed polishing surface 94 of substantially the same spherical curvature as the finished abraded surfaces 20a of lens blanks L is placed on said surfaces 20a and is supported by a spindle mechanism 95 of the polishing apparatus. The spindle mechanism 95 is carried by a forwardly extending pivot arm 96 having a weight 97 thereon which exerts a downwardly directed force on the polishing tool 93. Arm 96 is pivotally carried by a shaft 100 which is adapted to be oscillated in the direction of its longitudinal axis by any suitable motivating means, not shown, which operates a drive mechanism 101.

By simultaneously rotating shaft 90 and oscillating the polishing tool 93, while applying a suitable conventional polishing medium, in liquid form, to the surfaces 20a of lens blanks L, a polishing of the surfaces 20a will be brought about.

With the proper selection of a polishing medium and tool 93 a relatively high speed polishing operation may be accomplished.

After polishing the surfaces 20a or blanks L, the block 30 is removed from the polishing apparatus and the finished lens blanks are deblocked by lightly striking the overhanging parts of the concave sides thereof with a wooden mallet or the like. The finished lens blanks are then cleaned.

It is to be particularly noted that absolutely no contact is made with the finished RP surfaces 21 of the lens blanks during the above described procedure of optically finishing the surface 20a thereof and simultaneously reducing the height of the ledges 27 to a desired minimum.

From the foregoing, it can be seen that improved, simplified and economical means and method have been provided for manufacturing one piece multifocal lens blanks of the character described and for obtaining all of the objects and advantages of the invention. However, it is apparent that many changes in the details of construction, arrangement of parts and the steps in the process may be made by those skilled in the art without departing from the spirit of the invention as expressed in the accompanying claims and the invention is therefore not to be limited to the exact matters shown and described as only the preferred matters have been set forth by way of illustration.

Having described our invention, we claim:

1. The method of simultaneously completing a plurality of onepiece multifocal lens blanks each having at least one optically finished curved focal field and a raised differently curved semifinished focal field on a side surface thereof with a substantially straight clifflike line of division joining said fields, said method comprising blocking a pair of said lens blanks on a single block with the surfaces of the semifinished focal fields thereof exposed and in adjacent edge-to-edge relation with each other and with said clifflike lines of division on said pair of blanks being disposed in spaced substantially parallel relation with each other and the curvatures of said semifinished focal fields being concentric about a common point on a central axis through said block, mounting a plurality of said blocks each having a pair of lens blanks thereon about the periphery of a rotatable holder with the central axis of each of said blocks disposed in a plane intersecting the axis of rotation of said holder at substantially right angles thereto and the surfaces of said semifinished focal fields being substantially equally spaced from said axis of rotation of said holder a distance greater than a finished radius of a curvature to be provided on said semifinished surfaces, relating said semifinished surfaces with a rotatable lens abrading tool having an abrading face portion formed to a curvature substantially equal to that desired of said finished curvature to be formed on said semifinished focal fields of said lens blanks by first positioning said holder and tool relative to each other so as to place the axis of rotation of said tool in said plane of the axes of said blocks and to place the center of curvature of said abrading face portion of the tool on said axis of rotation of said holder and at a controlled distance from said semifinished surfaces such as to remove the desired amount of material therefrom, rotating said holder and tool about their respective axes of rotation to cause the surfaces of said semifinished focal fields of the lens blanks on said blocks to be abraded by passing over the abrading face of said tool, thereafter removing said block and lens blanks from said adaptor and optically polishing the abraded surfaces of said blanks.

2. The method of simultaneously completing a plurality of onepiece multifocal lens blanks each having at least one optically finished curved focal field on one side surface and a raised differently curved surface portion on said side thereof with a substantially straight clifflike line of division joining said curved surface portion and said finished focal field and with said line of division being of a height greater than that desired on the finished lens blank, said method comprising blocking said lens blanks in pairs each on a single block with the respective differently curved surface portions exposed and in adjacent edge-to-edge relation with each other and with said clifflike lines of division on said pair of blanks being disposed in spaced substantially parallel relation with each other and with the curvatures of said differently curved surface portions being concentric about a common point on a central axis through said block, mounting a plurality of said blocks each having a pair of lens blanks thereon about the periphery of a rotatable adaptor with the axis of each of said blocks disposed in a plane intersecting the axis of rotation of said adaptor at substantially right angles thereto and with the curved surface portions of each of said blanks substantially equally spaced from said axis of rotation of said adaptor a distance greater than a finished radius of curvature to be provided on said curved surface portions, and abrading the exposed curved surface portions to a predetermined depth and finished radius of curvature by first positioning the axis of an abrading tool having an effective abrading portion of the curved shape desired to be abraded on said exposed curved surface portions of the blanks with its axis in the plane of the axes of the blocks and the center of curvature of its effective abrading portion on said axis of rotation of the adaptor and engaging said exposed curved surface portions of the blanks with said rotating abrading tool by rotation of said adaptor to produce said finished curvature on said blanks.

3. The method of simultaneously completing a plurality of onepiece multifocal lens blanks each having at least one optically finished curved focal field on one side surface and a raised differently curved unfinished focal field also on said side surface thereof with a substantially straight clifflike line of division joining said unfinished focal field and said finished focal field and said line of division being of a height greater than that desired on the finished lens blanks, said method comprising blocking pairs of said lens blanks each on a single block with the surfaces of said differently curved unfinished focal fields thereof exposed and in adjacent edge-to-edge relation with each other and with said clifflike lines of division on said pair of blanks being disposed in spaced substantially parallel relation and with the curvatures of said unfinished focal fields being concentric about a common point on a central axis through said block, mounting a plurality of said blocks each having a pair of lens blanks thereon about the periphery of a rotatable adaptor with the axis of each of said blocks lying in a plane normal to and intersecting the axis of rotation of said adaptor and with the surfaces of said unfinished focal fields being substantially equally spaced from the axis of rotation of said adaptor a distance greater than a finished radius of a curvature to be provided on said unfinished focal fields, relating said unfinished focal fields of said blanks with a rotatable lens abrading tool having a preformed abrading face portion of a curvature substantially equal to that ultimately desired of the surfaces of the unfinished focal fields of said lens blanks by first positioning said tool relative to said adaptor in such manner as to cause the axis of rotation of said tool to lie in said common plane and to intersect the axis of rotation of the adaptor at said point of intersection of said common plane therewith while locating the abrading face of the tool at a predetermined radial distance from the axis of rotation of said adaptor which distance is substantially equal to the radius of curvature of said abrading face on said tool, and rotating said adaptor and tool about their respective axes of rotation to cause said unfinished focal fields of the lens blanks to be abraded to a desired radius of curvature by passing over the abrading face of said tool and to simultaneously cause the height of said line of division between said unfinished and finished focal fields of the lens blanks to be reduced to a desired practical minimum.

4. The method of simultaneously completing a plurality of onepiece multifocal lens blanks each having at least one optically finished curved focal field on one side surface and a raised differently curved semifinished focal field also on said side surface with a substantially straight clifflike line of division between said fields and said line of division being of a height greater than that desired on the finished lens blank, said method comprising providing lens blocks each having a reference surface on one side thereof, blocking a pair of said lens blanks on the opposite sides of each of said blocks with the surfaces of the semifinished focal fields of said pair of lens blanks exposed and in adjacent edge-to-edge relation with each other and with said clifflike lines of division on said pair of lens blanks being disposed in spaced substantially parallel relation with each other and with the curvatures of said surfaces of the semifinished focal fields being concentric about a point lying on a central axis passing through said block, said semifinished surfaces of the lens blanks being at precontrolled substantially equal distances from said reference surface of the block, providing a rotatable block holder having a plurality of radially disposed reference mounting surfaces about its periphery, each of which is adapted to receive an individual block, said reference surfaces of the holder each being at precontrolled equal radial distances from the axis of rotation of said holder, detachably placing a plurality of blocks on said holder with the axes of said blocks lying in a common plane normal to and intersecting the axis of rotation of said holder, each of the reference surfaces of the blocks being seated against a respective one of the reference surfaces of the holder whereby the combined radial distance from the axis of rotation of the holder to said reference surfaces of the holder and the distances from the reference surfaces of the blocks to the respective semifinished surfaces of the lens blanks on said blocks will be substantially equal to the finished radius of of curvature desired to be provided on said semifinished surfaces plus an amount equal to the amount of material required to be removed from said semifinished surfaces to reduce the height of said clifflike line of division to a desired practical minimum, relating the semifinished focal fields of said blanks with a rotatable lens abrading tool having a preformed abrading face of a curvature substantially equal to that desired to be provided on said semifinished focal fields by first positioning said tool relative to said holder so as to cause its axis of rotation to lie in said common plane of the axes of said blocks and to intersect the axis of rotation of the holder at the point of intersection of said common plane with the axis of rotation of said holder while further positioning the abrading face of the tool at a predetermined radial distance from the axis of rotation of said holder substantially equal to the radius of curvature of said abrading face on said tool, rotating said holder and tool about their respective axes of rotation to cause the surfaces of said semifinished focal fields of the lens blanks to be abraded by passing over the abrading face of said tool whereby the semifinished fields will be abraded to the desired finished radius of spherical curvature and the height of said line of division between the semifinished and finished focal fields of the lens blanks will be reduced to a desired practical minimum, removing said blocks and lens blanks from said adaptor and optically polishing the said abraded surfaces.

References Cited in the file of this patent

UNITED STATES PATENTS

| 1,302,960 | Paige | May 6, 1919 |
| 1,370,042 | Parsons | Mar. 1, 1921 |
| 1,383,863 | Scheuerle | July 5, 1921 |
| 1,410,367 | Bugbee | Mar. 21, 1922 |
| 2,310,925 | Bardwell et al. | Feb. 16, 1943 |
| 2,493,206 | Okey | Jan. 3, 1950 |
| 2,582,087 | Turner et al. | Jan. 8, 1952 |
| 2,607,174 | Lanius | Aug. 19, 1952 |
| 2,683,342 | Dalton | July 13, 1954 |
| 2,723,514 | Lucker | Nov. 15, 1955 |
| 2,890,551 | Dalton | June 16, 1959 |